United States Patent [19]

Hiroshige et al.

[11] Patent Number: 4,955,598
[45] Date of Patent: Sep. 11, 1990

[54] PAPER FEEDING APPARATUS

[75] Inventors: Ken Hiroshige, Kanagawa; Sadayuki Ueha, No. 1793-635, Kanamori, Machida-shi, Tokyo, both of Japan

[73] Assignees: Fuji Xerox Co., Ltd.; Sadayuki Ueha, both of Tokyo, Japan

[21] Appl. No.: 248,856

[22] Filed: Sep. 26, 1988

[30] Foreign Application Priority Data

Sep. 28, 1987 [JP] Japan .................. 62-240779
Sep. 28, 1987 [JP] Japan .................. 62-240780

[51] Int. Cl.$^5$ ............................................ B65H 5/10
[52] U.S. Cl. .................................. 271/267; 271/194; 198/769
[58] Field of Search .............. 271/18, 264, 266, 267, 271/146, 42, 128, 130, 8.1, 194; 198/630, 752, 766, 769

[56] References Cited

U.S. PATENT DOCUMENTS 3,929,221 12/1975 Armstrong ............... 271/267 X
3,929,328 12/1975 Knappe .................... 271/267
4,405,043 9/1983 Burghart ................... 198/769
4,795,025 1/1989 Doke ...................... 198/766 X

FOREIGN PATENT DOCUMENTS 757418 8/1980 U.S.S.R.

Primary Examiner—Richard A. Schacher
Attorney, Agent, or Firm—Finnegan, Henderson, Farabow, Garrett, and Dunner

[57] ABSTRACT

A paper feeding apparatus comprises a flexible vibrating body made of an elastic matter. The body is excited with a resonant frequency so as to produce a progressive wave. A driving vibrator is fixed to one end of the flexible vibrating body, and a receiving vibrator is fixed to the other end thereof. A mechanism is included for urging paper against the flexible vibrating body, so that when the vibrating body is excited, the paper is conveyed.

18 Claims, 7 Drawing Sheets

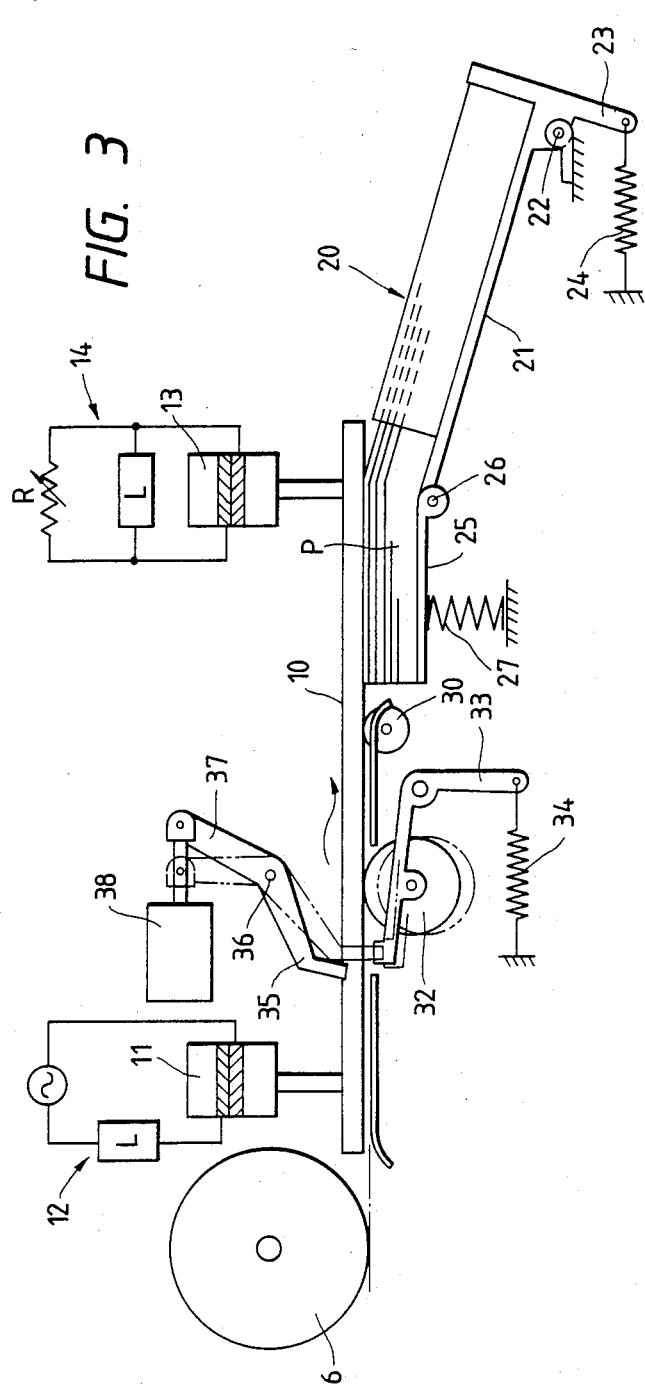
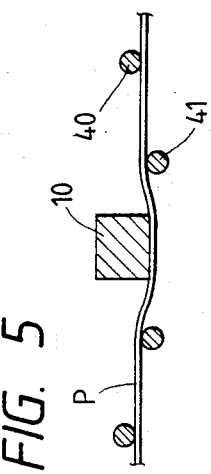
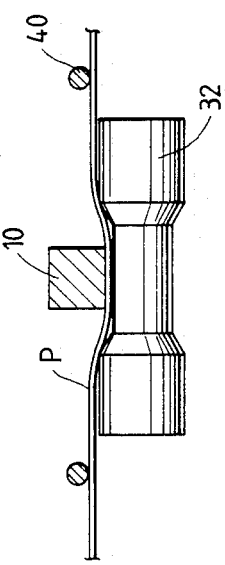
FIG. 3
FIG. 5
FIG. 4

PAPER FEEDING APPARATUS

FIELD OF THE INVENTION

The present invention relates to a paper feeding apparatus for the use in a system such as a copying machine, a printer, or the like, and particularly, according to a first aspect thereof, relates to a paper feeding apparatus in which a progressive wave is excited in a flexible vibrator and paper is urged against the flexible vibrator so that the paper can be conveyed without using a paper feeding roller.

According to a second aspect, the present invention relates to a paper feeding apparatus in which paper is fed by means of rotation of rollers provided on a paper conveying path in a system such as a copying machine, a facsimile, or the like, and particularly relates to a paper feeding apparatus in which paper feed rollers are driven by a driving mechanism of an ultrasonic motor system.

BACKGROUND OF THE INVENTION

Conventionally, a system such as a copying machine using cut sheet paper has used a paper feeding apparatus arranged such that a paper feed cassette or a paper feed tray is provided at a paper feed portion of a copying machine body so that paper housed in the cassette or tray is fed by a paper feed roller and conveyed along a paper conveying path.

Such a conventional paper feeding apparatus using a paper feed roller is arranged as shown in FIG. 7. In FIG. 7, a swingable bottom plate is provided inside a paper feeding cassette 1 in such a manner that the bottom plate is pivotally supported at its rear end and pushed up by a spring at its front end on the paper feeding side so as to urge paper P housed in the paper feeding cassette 1 against a paper feed roller 2.

In the paper feeding apparatus shown in this conventional example, paper P is fed out by means of rotation of paper feed roller 2. The paper P is then conveyed through a guide 3 and a registration gate 4, and further conveyed by conveying rollers 5 in timed relation to the positioning of a toner picture formed on a photosensitive drum 6, so that the toner picture formed on photosensitive drum 6 is transferred onto paper P due to the discharge of a transferring/removing corotron 7.

The paper P carrying the toner picture is sent to a fixing device 9 through a suction belt conveying device 8. The paper P is heated and pressed by fixing device 9 so that toner is fused to thereby complete a copy.

In such a paper feeding apparatus in a copying machine as described above, although paper conveying members such as the conveying rollers, the paper feed roller, the belt conveying device, and so on, are driven at speeds that are different from each other, generally, they are driven by the same motor through transmitting means such as driving belts, chains or the like. Sprockets, clutches or the like are provided on the respective shafts of the conveying members so that clutches are switched on and off in accordance with the timing of the transmitting means so as to convey paper.

Conventionally, in a system such as a copying machine, a facsimile, or the like, a paper conveying means is used in which rollers provided along a paper conveying path are rotated to thereby convey paper.

Such a roller paper-feeding apparatus in a copying machine is shown in FIG. 15. The paper feeding mechanism includes a paper feed cassette 101, paper feeding belt 102 and a paper feed roller 103. Paper housed in paper feed cassette 101 is fed by paper feeding belt 102 and paper feed roller 103 of the paper feed device and is conveyed by conveying rollers 104 along a paper conveying path. A toner picture is transferred onto the paper from a photosensitive drum 109 on the paper conveying path. The paper carrying the toner picture is fed by a conveyor belt 105 to a fixing device. The paper is then heated and pressed' by the fixing device so that toner is fused and fixed on the paper to produce a copy.

In the paper conveying roller device, as described above, a chain 106 is engaged with sprockets 107, and a sprocket of a motor 108 so that sprockets 107 are driven by the motor 108. Clutches (not shown) are provided between the sprockets 107, and shafts of rollers 103. The clutches can be switched on and off so that rollers 103 are driven in the paper feeding mode to thereby convey the paper.

In the conventional apparatus as described above, friction is created between the paper and the roller or belt when the paper is taken out of the paper feed cassette. Accordingly, slip may occur between the paper and the roller or belt, thereby rubbing the paper. This rubbing generates a paper powder.

Moreover, in the paper feeding apparatus as described above, in order to drive components such as the paper feed roller and the paper conveying rollers, it is necessary to use a combination of transmission components such as motors, chains, timing belts, etc., and components such as clutches, on the respective shafts of the rollers. Accordingly, a relatively large space is required to house those components, resulting in design problems. The requirement for a control device so as to provide, for example, timing for feeding the paper further adds to the complexity and cost of the feeding apparatus. This increased cost precludes any reduction in the manufacturing cost of a copying machine.

Further, in the conventional apparatus as described above, it is necessary that driving force transmitting components such as chains, timing belts, etc., be provided between the components and each of the conveying rollers. It is also necessary that the reduction ratio of sprockets is set accurately in order to adjust the conveying speed of the respective conveying rollers. It is also necessary to provide clutches for intermittently driving each of the conveying rollers, and in addition to the clutches, it is necessary to provide a control system corresponding to each clutch for controlling the clutch.

When driving-force transmitting components such as a chain is provided between a motor and each of the conveying rollers, it is necessary that a number of intermediate sprockets are provided and that the winding angles of the conveying rollers with respect to the sprockets are set in accordance with the position of the paper conveying path in a conventional paper feeding apparatus. Accordingly, the driving mechanism of a conventional paper feeding apparatus is complicated. Furthermore, problems in miniaturizing the copying machine and in making the copying machine with separate units, are associated with a conventional paper feeding apparatus. This precludes a reduction in the manufacturing cost of the paper feeding apparatus.

SUMMARY OF THE INVENTION

It is therefore an object of the present invention to overcome the problems in the conventional paper feeding apparatus as described above.

It is another object of the present invention to provide a paper feeding apparatus in which the arrangement of driving means is simplified.

It is an object of the present invention according to a first aspect thereof to provide a paper feeding apparatus in which a driving transmission rod including a flexible vibrator comprising elastic matter is excited so that paper urged against the elastic matter is conveyed by the vibrations of the elastic matter, thereby simplifying the arrangement of the driving member.

It is an object of the present invention according to a second aspect thereof to provide a paper feeding apparatus in which a roller driving mechanism is simplified in such a manner that a plate-like driving member is provided with respect to rollers provided along a paper conveying path, and a flexible standing wave is excited in the driving member so as to drive the rollers to thereby convey paper.

In order to attain the above object according to the first aspect of the present invention, the paper feeding apparatus comprises a flexible vibrating body made of an elastic matter and is adapted to be excited with a resonant frequency to produce a progressive wave. A driving vibrator is fixed to one end of the flexible vibrating body and a receiving vibrator is fixed to the other end thereof. The paper feeding apparatus further comprises a mechanism for urging paper against the flexible vibrating body, whereby the flexible vibrating body is excited, and the paper is urged against the vibrating body so that the paper is conveyed.

According to the first aspect of the present invention, the paper feed rollers and the paper handling mechanism are formed by one or more flexible vibrating bodies, thus making the arrangement of the paper feeding apparatus compact and simple.

Further, according to the first aspect of the present invention, the paper feeding apparatus can be provided at a desired position along a paper conveying path in a system such as a copying machine, printer, etc. Furthermore, it is not necessary to provide any driving and transmitting member in the paper conveying apparatus, so that the arrangement of the paper conveying path can be simplified. Accordingly, the flexibility in the design of the system can be increased.

In order to attain the above object according to the second aspect of the present invention, the paper feeding apparatus is arranged such that a plurality of pieces of piezo-electric ceramics, which are polarized in a reverse direction, are placed on a surface of the elastic matter of the flexible vibrating bed. A flexible standing wave is produced in the elastic matter which is provided along a paper conveying path. Rollers are provided for urging the paper against the flexible vibrating body and are rotated to convey the paper touching the rollers.

BRIEF DESCRIPTION OF THE DRAWINGS

FIG. 3 is a side view showing the arrangement of a second embodiment of the paper feeding apparatus of the present invention;

FIGS. 4 and 5 are sectional views showing the arrangement of the paper conveying path of the present invention;

PREFERRED EMBODIMENTS OF THE INVENTION

Referring to illustrated embodiments, the arrangements of the paper feeding apparatus according to the present invention will be described.

Figure 1:
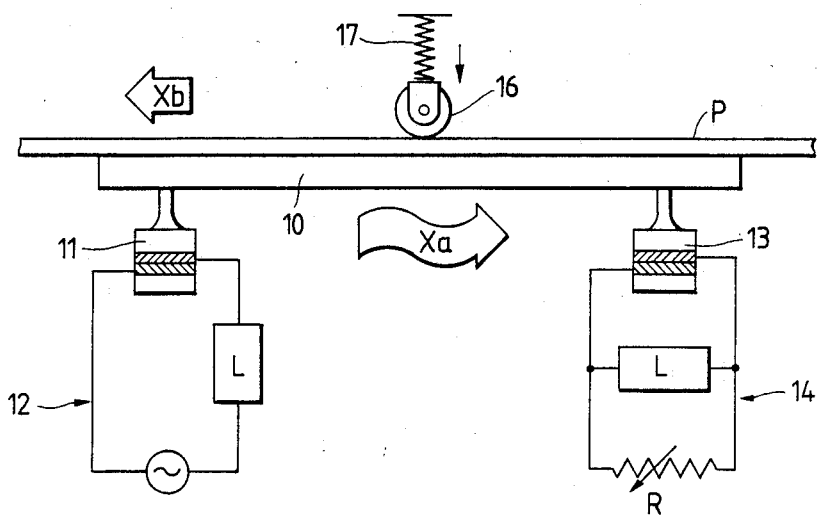
FIG. 1 is a schematic view of a first embodiment of the paper feeding apparatus of the present invention.

FIG. 1 is a schematic view of a first embodiment of the paper feeding apparatus of to the present invention. The apparatus is arranged such that paper P is urged against a driving transmission rod 10 so that the paper P is conveyed by means of vibrations of the driving transmission rod 10. In this embodiment, driving vibrator 11 is provided on driving transmission rod 10 at a forward end thereof in the advancing direction Xb of the paper. An oscillator circuit 12 is connected to the driving vibrator 11 so as to feed power of a predetermined frequency to the vibrator 11.

A wave-receiving vibrator 13 is fixed at a rear end of driving transmission rod 10. A wave-receiving circuit 14 for eliminating the standing wave is connected to wave-receiving vibrator 13. Wave-receiving circuit 14 is provided with resistor R for matching the characteristic impedance of driving transmission rod 10. Paper P is guided onto the upper surface of driving transmission rod 10 and is urged against driving transmission rod 10 by a spring 17 through a pressing roller 16 so that the paper can be conveyed.

The driving transmission rod 10, according to the present invention, is made of a material such as an aluminum alloy, (duralumin, for example) which has elasticity and little vibration loss. The aluminum alloy is formed into a plate having a thickness of 2-3 mm and a width of about 10-15 mm. Driving vibrator 11 and wave-receiving vibrator 13 are fixed to driving transmission rod 10 by an adhesive, welding, or the like.

Vibrations of a predetermined frequency are transmitted from driving vibrator 11 to driving transmission rod 10 and the transmitted vibrations are received by wave-receiving vibrator 13, so that a flexible progressive wave is generated in a section of driving transmission rod 10 between driving vibrator 11 and wave-receiving vibrator 13.

Figure 2:
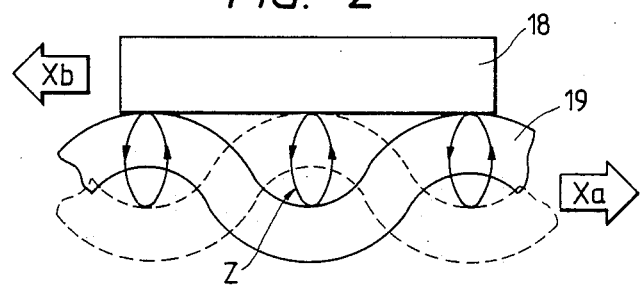
FIG. 2 is a schematic view explaining the operational principle of the paper feeding apparatus of the present invention.

Referring to FIG. 2, the operation in which paper is conveyed by the driving transmission rod 10 will be described. As shown in FIG. 2, if vibrations of a predetermined frequency are applied to an elastic matter 19 by an exciting mechanism, a progressive wave is excited in the elastic matter 19 in the direction of arrow Xa. When paper is urged against the progressive wave generating portion of the driving transmission rod 10, it is conveyed in a direction Xb opposite to the direction Xa of the progressive wave.

Also, a point on the surface of the vibrating elastic matter 19 performs elliptic movement as shown by an arrow Z. Accordingly, a movable element 18 such as paper P is moved in the direction of arrow Xb.

The driving transmission rod 10 according to the present invention performs an operation similar to the stator of the above-mentioned ultrasonic motor, in which paper P, the movable matter, is moved on the progressive-wave generating portion of driving transmission rod 10 shown in FIG. 1 in the direction opposite to the progressive wave progressing direction Xa.

The oscillator circuit 12 connected to the driving vibrator 11 generates vibrations in the driving vibrator 11 to excite the driving transmission rod 10. Wave-receiving vibrator 13 is provided on the other end of the driving transmission rod 10. Wave-absorbing vibrator 13 absorbs the progressive wave transmitted through the driving transmission rod 10 by means of the wave-receiving circuit.

According to the present invention, a longitudinal-wave oscillator constituted by a Langevin vibrator and a horn is used for each of the driving vibrator and the wave-receiving vibrator invention. A vibration output portion of the driving vibrator 11 is fixed at a position of a node of a flexible standing wave for exciting driving transmission rod 10 so as to generate a flexible standing wave. The wave of vibrations is received by the wave-receiving vibrator 13 provided at the other end of driving transmission rod 10, so that a progressive wave is generated at a section of driving transmission rod 10 between the driving vibrator 11 and wave-receiving vibrator 13.

Accordingly, the section between the driving vibrator 11 and the wave-receiving vibrator 13 is a progressive wave portion so that paper is conveyed in this section. A standing wave is generated, however, in the section of the driving transmission rod 10 outside a portion where the wave-receiving vibrator 13 is connected. Being incapable of directly conveying paper, this standing wave section may be arranged to separate a stack of sheets of paper from each other by using the vibrations.

FIG. 3 shows a second embodiment in which the paper feeding apparatus of the first embodiment is provided as a paper feed device in a copying machine. In this second embodiment, not only is a driving transmission rod 10 used as a paper conveying means on a paper conveying path from a paper feed cassette 20 to a photosensitive drum 6, but a forward end portion of the driving transmission rod 10 is used for performing an operation similar to that of a paper feed roller in the conventionally used copying machine.

In the second embodiment shown in FIG. 3, driving transmission rod 10 is arranged along a paper conveying path. Driving vibrator 11 and wave-receiving vibrator 13 are fixed on driving transmission rod 10 at its one end portion on the side of the photosensitive drum 6 and at its other end portion on the side of the paper feed cassette 20, respectively. Driving vibrator 11 and wave-receiving vibrator 13 are provided with a driving circuit 12 and a wave-receiving circuit 14, respectively.

A bottom plate 21 for mounting paper P thereon is swingably supported on the paper feed cassette 20 through a pivot 22, and a lever 23 projecting from the bottom plate 21 at its end portion is connected to a spring 24 so that the bottom plate 21 is urged upwardly to a paper-feeding side.

A front plate 25 is provided through a hinge 26 on the bottom plate 21 at its forward end portion on the paper feeding side so that a forward end portion of paper P at the paper feeding side can be urged against the lower surface of the driving transmission rod 10 by means of a spring 27 provided at a lower portion of front plate 25. A handling roller 30 is provided for handling paper conveyed from the paper feed cassette 20.

Handling roller 30 is urged against driving transmission rod 10 with force weaker than the force with which paper P is urged against driving transmission rod 10, so as to perform the paper handling operation. Handling roller 30 handles the paper because of the thrust on an upper sheet of paper due to the frictional force between the upper sheet of paper and the driving transmission rod 10, and the frictional force between lower sheets of paper as they are conveyed. Therefore, the contact pressure of the handling roller and the quality of material of the roller are selected by taking into account the frictional characteristics of the upper and lower sheets of paper and the driving transmission rod.

An idler roller 32 and a registration finger 35 are also provided for urging the paper against driving transmission rod 10. Idler roller 32 is located in the paper conveying path after handling roller 30. Idler roller 32 is supported by a lever 33, which is urged by a spring 34, so that idler roller 32 can be urged against driving transmission rod 10 with predetermined force.

In the illustrated second embodiment, the registration finger 35 is located in the paper conveying path after idler roller 32. Registration finger 35 is arranged to be pivotable about a pivot 36 and is connected at its upper end portion to a lever 37 of a solenoid 38 so that a paper conveying path is opened and closed by the operation of the solenoid 38. Thus, if solenoid 38 is turned on, the registration finger 35 is swung so that a free end of the registration finger 354 closes the paper conveying path. Paper P being conveyed by driving transmission rod 10 is then stopped at a particular position in the paper conveying path.

A mechanism for swinging idler roller 32 downward upon closure of the paper conveying path by the registration finger 35 may be provided. The lower end portion of registration finger 35 is extended to project downward from the paper conveying path to gently abut against a top end portion of lever 33 supporting idler roller 32.

In the arrangement described above, the force for urging the paper P against the driving transmission rod 10 is weak, so that the free end portion of the registration finger 35 gently abuts against paper P being conveyed on the paper conveying path. The paper is stopped while sliding relative to driving transmission rod 10 to thereby perform registration of the paper.

Thereafter, if solenoid 38 is turned off, registration finger 35 is swung upward so as to release the closure of the paper conveying path. Simultaneously, idler roller 32 is urged upward by the force of spring 34 so as to urge paper P against driving transmission rod 10, resulting in the conveyance of paper.

Idler roller 32 according to the present invention bends paper P so as to make paper P follow the outer periphery of driving transmission rod 10 as shown in FIG. 4. Paper P is thus sufficiently urged against the driving transmission rod 10. The bending of the paper prevents generation of skew in conveying the paper.

In the example shown in FIG. 4, upper paper guides 40 are provided on the paper conveying path in parallel to driving transmission rod 10 in order to guide paper P. Alternatively, as shown in FIG. 5, upper guides 40 as well as lower paper guides 41 are provided on upper and lower sides of the paper conveying path respectively, so that when the paper is passed between guides 40 and 41, a bent portion of the paper is formed by the upper and lower guides 40 and 41. The bent portion forms the contact portion between driving transmission rod 10 and paper P.

Where the paper conveying path is arranged in a manner as described above, the provision of the paper conveying apparatus according to the present invention is not limited to the paper feed portion. The paper conveying apparatus may be also provided in the paper conveying path so that the arrangement can be simplified.

Figure 6:
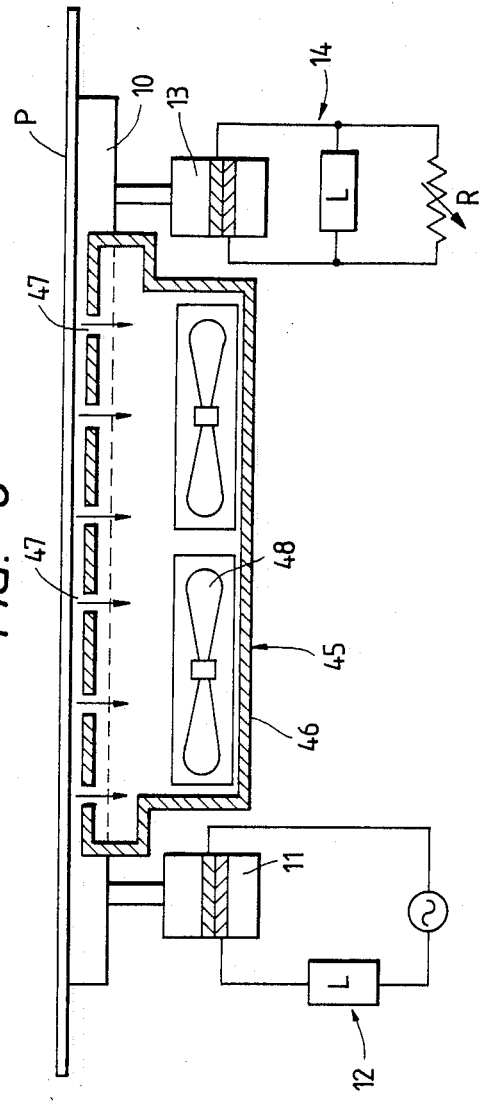
FIG. 6 is a side view of a third embodiment of the paper feeding apparatus of the present invention.
Figure 7:
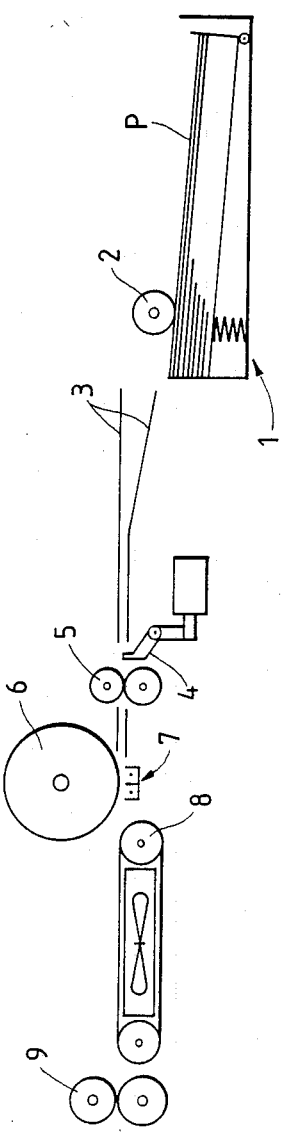
FIG. 7 is a side view of a conventional paper conveying apparatus.
Figure 8A:
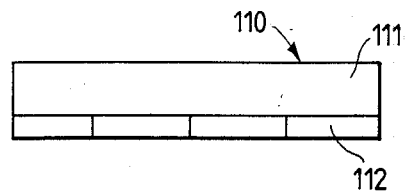
FIGS. 8(a) through (e) are schematic views for explaining the operational principle of the paper feeding apparatus of the present invention.
Figure 8B:
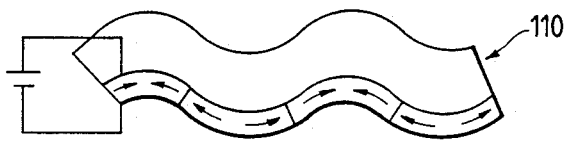
Figure 8C:
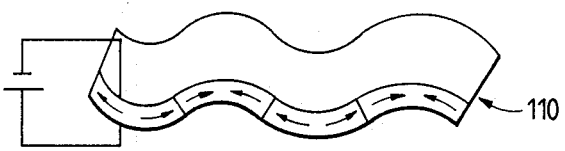
Figure 8D:
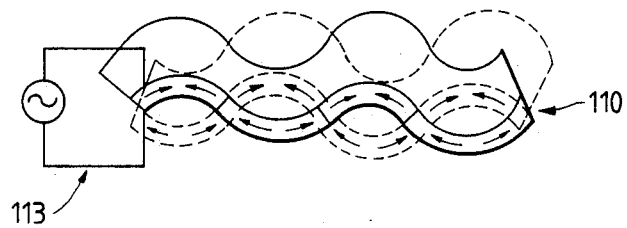
Figure 8E:
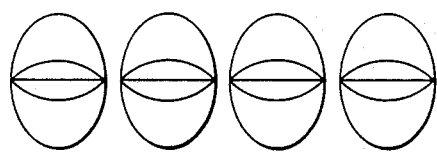

FIG. 6 shows a third embodiment in which a vacuum suction apparatus is used as means for urging paper against the driving transmission rod instead of the idler roller. In the third embodiment, paper put on the upper surface of driving transmission rod 10 is sucked by a vacuum device 45 provided on a side portion of driving transmission rod 10 so that paper P is urged against driving transmission rod 10 with predetermined force.

Fans 48 are provided under a casing 46 as part of a vacuum device 45 that sucks air through a number of suction holes 47 provided in the upper surface of the casing 46 to suck the paper into the paper conveying apparatus. The paper is urged against the driving transmission rod 10 by the sucking operation, so that the paper is conveyed by the conveying operation with the conveying force due to vibrations of the driving transmission rod 10. As in the foregoing embodiments, a driving vibrator 11 and a wave-receiving vibrator 13 are provided on driving transmission rod 10 at its opposite end portions respectively, so that paper is conveyed in the direction opposite to the direction of the progressive wave excited on the driving transmission rod.

Although the case where the driving transmission rod according to the present invention is applied to a portion of the paper feeding apparatus has been described in the above embodiments of the present invention, the driving transmission rod according to the present invention can also be used in place of the conveying roller on the paper conveying path. In the latter case, a pinch roller or the like may be used so as to urge paper against the driving transmission rod.

Furthermore, the length of the driving transmission rod according to the present invention can be selected as desired. Also, the driving transmission rod can be applied not only to a straight paper-conveying path but also to a curved paper-conveying path.

The driving transmission rod according to the present invention comprises only a plate-like member, a driving vibrator, and a wave-receiving vibrator, so that the apparatus can be made compact and therefore can be easily incorporated in a copying machine. Also, maintenance of the apparatus can be easily performed.

Accordingly, the paper feeding apparatus using the driving transmission rod according to the present invention does not require arrangement of any driving transmission member or the like along a paper conveying path. Thus, the paper conveying path can be simplified in arrangement, the control mechanisms for conveying paper can be reduced in number, and the flexibility in design can be improved. Accordingly, the driving transmission rod contributes to the reduction in copying machine size as well as manufacturing cost.

The operational principles of a flexible wave transmission rod according to a fourth embodiment of the present invention are described with reference to FIGS. 8 and 9. If a number of pieces of piezo-electric ceramics used in the fourth embodiment of the present invention are polarized in the reverse direction, and if a voltage is applied to those pieces of piezo-electric ceramics, phenomena of "expansion" and "shrinkage" occur in adjacent ones of the pieces of piezo-electric ceramics. Distortion thus occurs in each piece of piezo-electric ceramics. In that case, if the polarity of the voltage to be applied to the respective pieces of piezo-electric ceramics is reversed, the distortion in each piece of piezo-electric ceramics is also reversed.

In the example shown in FIG. 8, a flexible wave transmission rod 110 according to the present invention is arranged such that a number of pieces of piezo-electric ceramics 112 are placed on one surface of an elastic member 111 as shown in the diagram (a). A material, such as an aluminum alloy (duralumin, for example), having elasticity and having little vibration loss is used for the elastic member 111 constituting the flexible wave transmission rod 110.

If the pieces of piezo-electric ceramics 112 of the flexible wave transmission rod 110 are placed on elastic member 111 in the state where the directions of the polarity are alternately reversed as described above, and if a voltage of a predetermined polarity is applied to the respective pieces of piezo-electric ceramics, the phenomena of "expansion" and "shrinkage" occur in adjacent ones of the pieces of piezo-electric ceramics in alternately reversed conditions as shown in the diagram (b) in FIG. 8. Flexure occurs in each of the pieces of piezo-electric ceramics such that the portions of the elastic member 111 having the extended pieces of piezo-electric ceramics become troughs while the portions of the elastic member 111 having the shrunken pieces of piezo-electric ceramics become crests.

As shown in the diagram (c) of FIG. 8, if the polarity of the applied voltage is changed, the phenomena of "expansion" and "shrinkage" of the pieces of piezo-electric ceramics are reversed, so that flexure reverse to that in the case shown in the diagram (b) occurs in the elastic member 111.

Accordingly, as shown in the diagram (d) of FIG. 8, if an AC voltage is applied to the pieces of piezo-electric ceramics from an AC power source 113, a flexible standing wave is generated in flexible-wave transmission rod 110. A flexible standing wave is a wave moving repeatedly vertically as shown in diagram (e) of FIG. 8.

Figure 9:
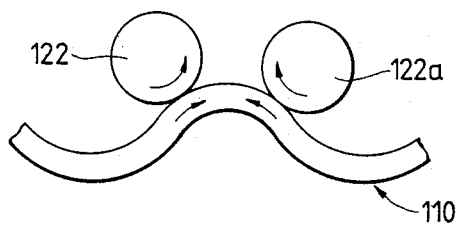
FIG. 9 is a schematic view for explaining the operational principle by which rollers are driven by a flexible-wave transmission rod.

As shown in FIG. 9, if shafts 122 and 122a of feed rollers are urged against the surface of flexible-wave transmission rod 110, the roller shafts can be rotated in the directions shown by arrows respectively in accordance with the relation between the position of the flexible standing wave occurring in flexible-wave transmission rod 110 and the position of the roller shafts 122 and 122a.

In such rotation of the rollers, the speed of the rotation is controlled by conditions such as an amplitude of the flexible wave, conditions of pressure contact (friction coefficient, pressure), etc. Paper is urged against the rollers, or the like, by pinch rollers, so that the paper can be fed or conveyed at a predetermined speed.

Figure 10:
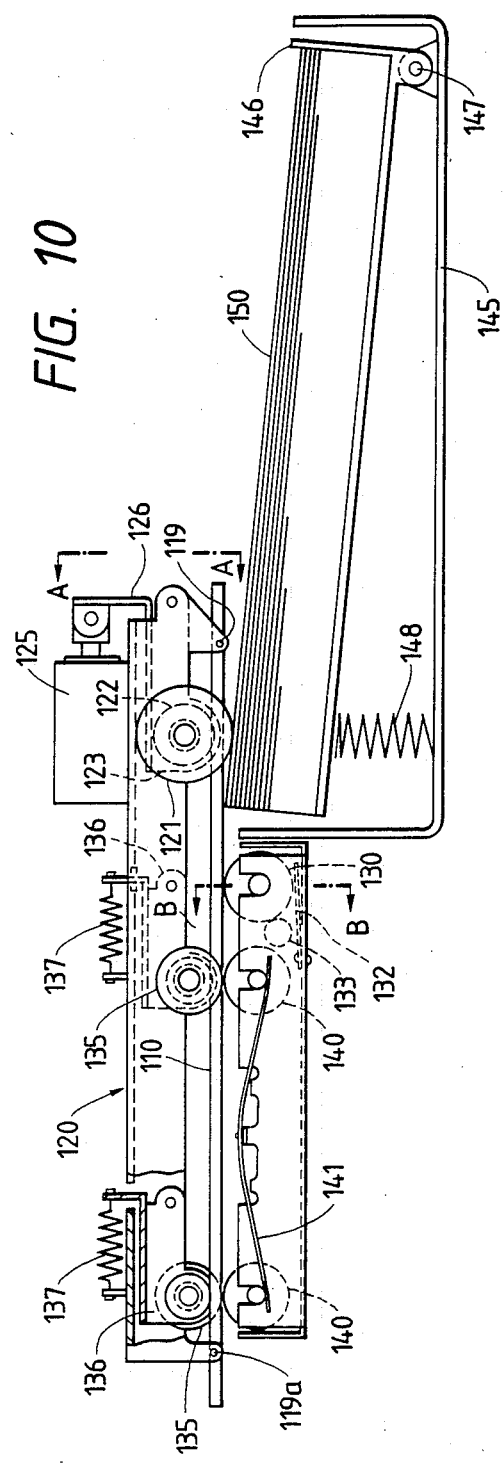
FIG. 10 is a side view showing the arrangement of a fourth embodiment of the paper feeding apparatus of the present invention.
Figure 12:
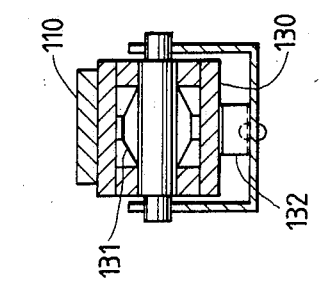
FIG. 12 is a sectional view taken along line B—B in FIG. 10.
Figure 11:
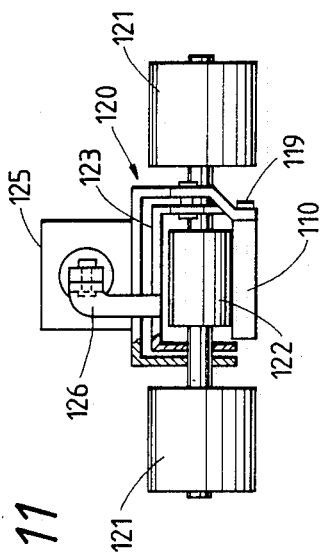
FIG. 11 is a side view taken along line A—A in FIG. 10.

FIGS. 10 through 12 show a fourth embodiment of the present invention. In this embodiment, a flexible-wave transmission rod is applied to a paper feeding apparatus of a copying machine or the like. The paper-feed roller and the conveying roller are driven by the foregoing flexible-wave transmission rod to convey paper.

In the fourth embodiment of FIGS. 10–12, flexible-wave transmission rod 110 is attached to a paper feeding apparatus body 120 through pins 119 and 119a so that the shafts of the rollers are urged against the upper surface of flexible-wave transmission rod 110.

In the illustrated embodiment, a pair of paper feed rollers 121 and a plurality of paper conveying rollers 134 and 135 are provided as the rollers. Rollers 134 and 135 are driven by flexible-wave transmission rod 110.

A shaft 122 of paper feed rollers 121 is supported by a roller arm 123 that is connected to an arm 126 of a solenoid 124. When solenoid 124 is actuated, the shaft of paper feed rollers 121 is urged against flexible-wave transmission rod 110 so that rollers 121 are driven by flexible-wave transmission rod 110.

FIG. 11 shows in detail the manner in which paper feed rollers 121 are attached. When roller shaft 122 is urged against flexible-wave transmission rod 110, roller shaft 122 is rotated as in the embodiment shown in FIG. 9, so that the rollers mounted on the opposite sides of roller shaft 122 feed the paper.

Conveying rollers 135 are provided with a predetermined interval therebetween in paper feeding apparatus body 120. Conveying rollers are supported by roller arms 136 respectively so that they are urged against the flexible-wave transmission rod 110 by means of springs 137 with predetermined force. Rollers 135 are disposed in phase with each other with respect to the vibration waveform of flexible-wave transmission rod 110 so that the rollers rotate in the same direction.

Pinch rollers 140 are provided corresponding to conveying rollers 135. Pinch rollers 170 are urged against conveying rollers 135 by means of springs 141. Paper is conveyed when it is sandwiched between conveying rollers 135 and pinch rollers 140.

A handling roller 130 is provided at a position where the paper is fed out by paper feed rollers 121. Handling roller 130 is mounted on a support shaft through a one-way clutch 131 so that it is urged against flexible-wave transmission rod 110 by a plate spring 132 as shown in FIG. 12.

Handling roller 130 is arranged so as to be rotated only in the direction of the arrow that is opposite to the paper feeding direction by means of one-way clutch 131. Thus, handling roller 130 is urged against flexible-wave transmission rod 110, so that handling roller 130 drives the paper in the direction to return the paper. Thus, the roller 130 functions as a paper handling mechanism.

Although any means, for example, a paper feed cassette, a paper tray, or the like, may be used as the paper feed device to be used in the paper feeding apparatus according to the present invention, the illustrated embodiment uses a paper feed cassette. A paper feed cassette body 145 is arranged such that a tray 146 is supported at its rear end portion by pivots 147 and is urged up at its end portion on the paper feeding side by a spring 148 so that paper 150 put on the tray 146 is urged against paper feed rollers 121.

In the paper feeding apparatus according to a fourth embodiment of the present invention, conveying rollers 135 and handling roller 130 are urged against flexible-wave transmission rod 110 so that the rollers are rotated by frictional force with flexible-wave transmission rod 110 under the conditions that a voltage is applied by an oscillator circuit to the pieces of piezo-electrics ceramics of flexible-wave transmission rod 110 arranged as shown in the embodiment of FIG. 8. A standing wave is thus excited on flexible-wave transmission rod 110. At that time, rollers 130, 135 are set at predetermined positions relative to flexible-wave transmission rod 110 so that those rollers may carry out both the paper feeding and paper handling operations.

If a solenoid is excited, the shaft of paper feed rollers 121 is urged against flexible-wave transmission rod 110, and the paper feed rollers 121 are rotated by means of friction between the flexible-wave transmission rod 110 and the roller shaft 122. Paper 150 is thus fed out of the paper feeding cassette.

Figure 13:
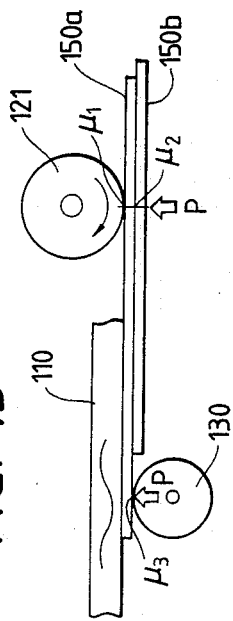
FIG. 13 is a plan view explaining the operational principle of a paper handling mechanism in the paper feeding apparatus of the present invention.

When paper 150 is passed through the paper handling mechanism of handling roller 130, it is prevented from being fed in stacks as shown in FIG. 13. That is, assume now that the friction coefficient $\mu_1$ between paper feed rollers 121 and the paper, the friction coefficient $\mu_2$ between the sheets of paper, and the friction coefficient $\mu_3$ between handling roller 130 and the paper are set to establish the following relation $$\mu_1 P > \mu_3 P > \mu_2 P$$

where P represent the contact pressure of paper with each of rollers 121 and 130. In that case, the handling roller 130 is caused to rotate in the direction reverse to the paper conveying direction and is stopped by one-way clutch 131.

In the conditions as described above, if only one sheet of paper is conveyed, the paper overcomes the resistance of handling roller 130 with the conveying force of paper feed rollers 121 so that the paper is conveyed to conveying rollers 135. If sheets of paper are conveyed in stacks on the other hand, only upper sheet 150a of the stacked paper is conveyed toward conveying rollers 135 in spite of the resistance of handling roller 130, while a lower sheet 150b of the stacked paper is stopped by the resistance of handling roller 130. At that time, the frictional force between flexible-wave transmission rod 110 and the paper is made substantially negligible by the vibrations of flexible-wave transmission rod 110.

Further, in the position in which paper has completely passed handling roller 130, the resistance of handling roller 130 does not act against the paper, so that the handling roller 130 is rotated by the contact with flexible-wave transmission rod 110 in the direction reverse to the paper conveying direction. During rotation, handling roller 130 comes into contact with a cleaner 122 so that paper powder, dust etc., attached on the surface of roller 130 can be removed.

Figure 14:
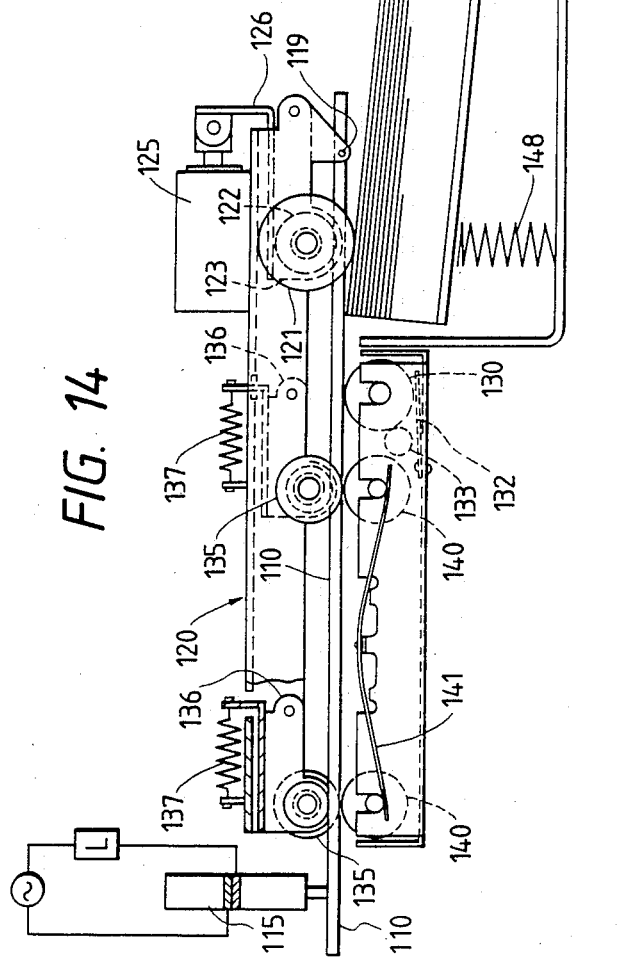
FIG. 14 is a side view showing a fifth embodiment of the paper feeding apparatus according to the present invention.
Figure 15:
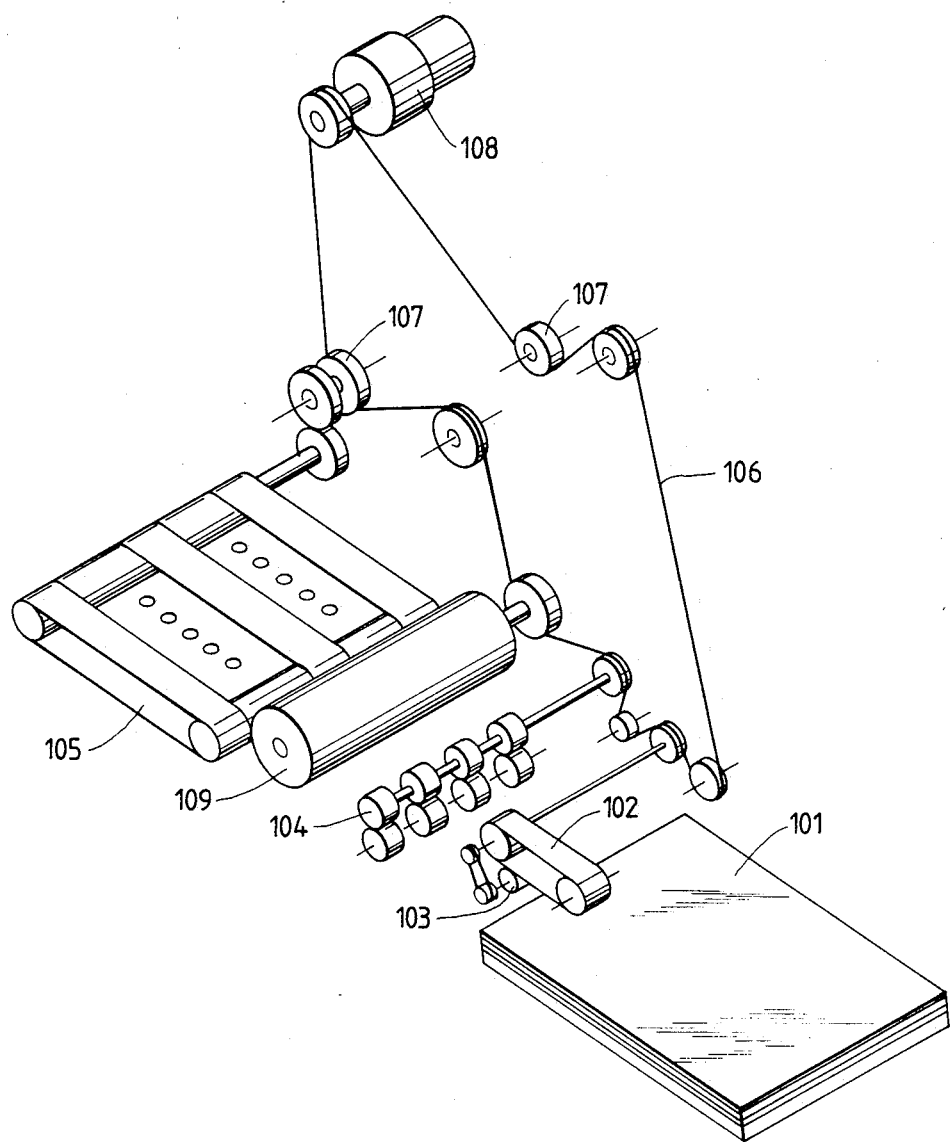
FIG. 15 is a plan view of a conventional paper feeding apparatus.

FIG. 14 shows a fifth embodiment of the present invention which is different from the embodiment of FIG. 10 with respect to the excitation method of flexible-wave transmission rod 110. In the embodiment of FIG. 10, as described above, pieces of piezo-electric ceramics are placed directly on the elastic matter and voltages of different polarity are applied to adjacent ones of the pieces of piezo-electric ceramics so as to excite a flexible standing wave on the elastic matter. In the apparatus shown in FIG. 14, however, a top end of a longitudinal-wave oscillator device 115, constituted by a Langevin vibrator and a horn, is connected to a position of a node of a flexible standing wave excited in an elastic manner so that the flexible standing wave is produced in the flexible-wave transmission rod.

Also in this fifth embodiment, similar to the embodiment of FIG. 10, paper feed rollers 121 and conveying rollers 135 are urged against the upper surface of flexible-wave transmission rod 110 and the rollers are driven by the excitation of flexible-wave transmission rod 110 so as to convey paper. Further, a paper handling mechanism is constituted by a handling roller 130 so that the paper is fed out of a paper feed cassette 145 and paper is prevented from being conveyed in the stacks.

In the paper feeding apparatus according to the present invention, the paper feed rollers are directly connected to a driving source, that is, the elastic member on which a flexible standing wave is excited. The rise time of the flexible-wave transmission rod is extremely short (on the order of several msec). Accordingly, the response time of paper conveyance is much higher than that in a conventional paper conveying apparatus. That is, in comparison with an apparatus driven by a conventional motor through a chain or the like, the paper feeding apparatus according to the present invention does not require any components such as sprockets, clutches, or other driving force transmitting members, etc., but can drive the rollers directly by means of the flexible-wave transmission rod. Accordingly, it is possible to start paper conveying operation at the moment a power source is turned on.

Further, in the paper feeding apparatus according to the present invention, slippage never occurs between paper and the paper feed roller as it does in a conventional paper feed roller using sprockets, so that variations in registration never occur in conveying paper. By using paper feeding apparatus of the present invention for feeding paper, particularly in color copying, displacement in color toner pictures can be prevented, to make it possible to obtain a clear color copy.

Although the apparatus according to the fourth and fifth embodiments, of the present invention is used as a part of a paper feed device, the apparatus may be provided at the desired position on a paper conveying path in a system such as a copying machine, a printer, etc., in which cut sheet paper is conveyed. Also, the apparatus according to the present invention not only drives paper conveying rollers but also directly conveys paper by urging the paper against a flexible-wave transmission rod through a pinch roller or the like.

The paper feeding apparatus according to the present invention has the advantage that is unnecessary to use any drive-transmitting members such as sprockets, chains, etc., as compared to a conventional paper conveying apparatus. The arrangement of the paper conveying apparatus can be simplified.

Furthermore, in the driving apparatus according to the present invention, pieces of piezo-electric ceramics are combined with an elastic member, and a longitudinal-wave oscillator device is attached to a flexible-wave transmission rod, so that the paper conveying apparatus can be miniaturized and can be manufactured in separate units. Accordingly, the paper conveying apparatus can be easily incorporated in a system such as a copying machine, a printer, etc.

Further, the driving mechanism according to the present invention may employ a curved paper conveying path, so that the driving mechanism can be disposed at a desired portion on a paper conveying path in a system such as a copying machine, a printer, etc.

What is claimed is:

1. A paper feeding apparatus comprising:
   a flexible vibrating body made of an elastic member and adapted to be excited with a resonant frequency to produce a progressive wave;
   a driving vibrator fixed to one end of said flexible vibrating body;
   a receiving vibrator fixed to the other end of said flexible vibrating body; and
   means for urging paper against said flexible vibrating body, whereby and the paper is urged against said vibrating body so that the paper is conveyed when said flexible vibrating body is excited.

2. The paper feeding apparatus of claim 1, further including means for eliminating the progressive wave.

3. The paper feeding apparatus of claim 2, wherein said means for eliminating the progressive wave includes a wave receiving circuit connected to said receiving vibrator.

4. The paper feeding apparatus of claim 3, wherein said wave receiving circuit includes a resistor for matching the characteristic impedance of said flexible vibrating body.

5. The paper feeding apparatus of claim 1, wherein said means for urging paper against said flexible vibrating body includes a vacuum suction apparatus.

6. The paper feeding apparatus of claim 5, wherein said vacuum suction apparatus includes a casing formed beneath said paper and having an upper surface having holes therein, a fan in said casing for sucking air through said holes to suck the paper onto the paper conveying apparatus.

7. The paper feeding apparatus of claim 1, further including a plurality of pieces of piezo-electric ceramic polarized in a reverse direction and mounted on a surface of said elastic member of said flexible vibrating body.

8. The paper feeding apparatus of claim 7, further including a voltage supply for applying a voltage of a predetermined polarity to said pieces of piezo-electric ceramics.

9. The paper feeding apparatus of claim 1, wherein said means for urging paper against said flexible vibrating body includes a plurality of rollers.

10. The paper feeding apparatus of claim 9, wherein said means for urging paper includes a solenoid having an arm and a paper feed roller having a roller arm connected to said arm of said solenoid such that when said solenoid is actuated, said roller arm is urged against said flexible vibrating body.

11. The paper feeding apparatus of claim 9, wherein said means for urging paper further includes paper conveying rollers and a spring for urging said rollers against said flexible vibrating body.

12. The paper feeding apparatus of claim 7, further including a longitudinal-wave oscillator connected to a node of said progressive wave.

13. The paper feeding apparatus of claim 12, wherein said means for urging paper against said flexible vibrating body includes a plurality of rollers.

14. The paper feeding apparatus of claim 12, wherein said means for urging paper includes a solenoid having an arm and a paper feed roller having a roller arm connected to said arm of said solenoid such that when said solenoid is actuated, said roller arm is urged against said flexible vibrating body.

15. The paper feeding apparatus of claim 12, wherein said means for urging paper further includes paper conveying rollers and a spring for urging said paper conveying rollers against said flexible vibrating body.

16. A paper feeding apparatus comprising:
a flexible vibrating body made of an elastic member of adapted to be excited with a resonant frequency to produce a progressive wave;
a driving vibrator fixed to one end of said flexible vibrating body;
a receiving vibrator fixed to the other end of the flexible vibrating body; and
means for urging paper against said flexible vibrating body including a spring-biased pressing roller, whereby the paper is urged against said vibrating body so that the paper is conveyed when said flexible vibrating body is excited.

17. A paper feeding apparatus comprising:
a flexible vibrating body made of an elastic member and adapted to be excited with a resonant frequency to produce a progressive wave;
a driving vibrator fixed to one end of said flexible vibrating body;
a receiving vibrator fixed to the other end of the flexible vibrating body; and
means for urging paper against said flexible vibrating body including an idler roller urged by a spring-biased lever, whereby the paper is urged against said vibrating body so that the paper is conveyed when said flexible vibrating body is excited.

18. The paper feeding apparatus of claim 17, wherein said means for urging paper further includes a pivotable registration finger having a upper end portion, a solenoid having a lever connected to said upper end portion, and a paper conveying path opened and closed by operation of the solenoid.

* * * * *